US009454803B1

United States Patent
Hsu

(10) Patent No.: US 9,454,803 B1
(45) Date of Patent: Sep. 27, 2016

(54) SYSTEM AND METHOD FOR SCENE DEPENDENT MULTI-BAND BLENDING

(71) Applicant: Google Inc., Mountain View, CA (US)

(72) Inventor: Stephen Charles Hsu, San Carlos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/331,260

(22) Filed: Jul. 15, 2014

Related U.S. Application Data

(63) Continuation of application No. 13/660,257, filed on Oct. 25, 2012, now Pat. No. 8,811,764.

(51) Int. Cl.
*G06K 9/40* (2006.01)
*G06T 5/00* (2006.01)

(52) U.S. Cl.
CPC ..................... *G06T 5/001* (2013.01)

(58) Field of Classification Search
CPC ........................................................ G06K 9/40
USPC .......................................................... 382/260
See application file for complete search history.

(56) References Cited

U.S. PATENT DOCUMENTS

| | | | |
|---|---|---|---|
| 6,271,847 B1 | 8/2001 | Shum et al. | |
| 6,359,617 B1 | 3/2002 | Xiong | |
| 6,744,442 B1 * | 6/2004 | Chan | G06T 15/04 345/582 |
| 6,762,769 B2 * | 7/2004 | Guo et al. | G06T 11/001 345/582 |
| 8,126,247 B2 | 2/2012 | Chiang et al. | |
| 8,160,391 B1 | 4/2012 | Zhu et al. | |
| 2008/0253678 A1 * | 10/2008 | Li | G06K 9/40 382/260 |
| 2010/0150472 A1 | 6/2010 | Chen | |
| 2011/0242126 A1 * | 10/2011 | Hoppe | G06T 5/50 345/589 |

OTHER PUBLICATIONS

Burt et al., "A Multiresolution Spline with Application to Image Mosaics", ACM Transactions on Graphics, vol. 2, No. 4, Oct. 1983, pp. 217-236.*
Burt et al., "A Multiresolution Spline with Application to Image Mosaics", ACM Transaction Graphics, vol. 2, No. 4, Oct. 1983, pp. 217-236.
Stephen Charles Hsu, U.S. Appl. No. 13/479,952, filed May 24, 2012, "Blending 3D Model Textures by Imaging Projection".

* cited by examiner

*Primary Examiner* — Gregory F Cunningham
(74) *Attorney, Agent, or Firm* — Dority & Manning, P.A.

(57) ABSTRACT

Systems and methods for generating a composite image from a plurality of source images using a scene dependent multi-band blending operation are provided. The multi-band blending operation implements a filtering operation to reduce blending between objects or surfaces that have natural color and/or brightness differences. More particularly, the typical space invariant upsampling that occurs during multi-band blending can be replaced by a scene dependent filtering operation during upsampling that omits or reduces contributions from pixels associated with different objects in a scene during the multi-band blending process. The scene dependent filtering can be based on scene dependent data, such as height data or slope data, which can be used to identify different objects in a scene.

14 Claims, 7 Drawing Sheets

SYSTEM AND METHOD FOR SCENE DEPENDENT MULTI-BAND BLENDING

PRIORITY CLAIM

The present application is a continuation of U.S. patent application Ser. No. 13/660,257 entitled "System and Method for Scene Dependent Multi-Band Blending," filed on Oct. 25, 2012. Applicant claims priority to and benefit of all such applications and incorporate all such applications herein by reference.

FIELD

The present disclosure relates generally to image processing and more particularly to systems and methods for generating a composite image of a scene using scene dependent multi-band blending of source images.

BACKGROUND

Geographic information systems provide for the archiving, retrieving, and manipulating of data that has been stored and indexed according to geographic coordinates of its elements. A geographic information system generally includes a variety of data types, including imagery, maps, three-dimensional models, tables, vector data (e.g. vector representations of roads, parcels, buildings, etc.) and other data. Improvements in computer processing power and broadband technology have led to the development of interactive geographic information systems that allow for the navigating and displaying of three-dimensional representations of geographic areas. For instance, a user of the geographic information system can control a virtual camera to navigate a three-dimensional representation of a geographic area of interest.

Textures, such as satellite images or aerial imagery, can be applied to a three-dimensional model of a geographic area to give the three-dimensional representation of the geographic area a more realistic appearance. When the textures for the three-dimensional representation are composited from a plurality of different source images, any illumination and exposure differences among the source images can lead to unnatural color discontinuities in the textured three-dimensional representation at the boundaries of the source images.

Source images of the geographic area can be blended to correct for discontinuities in the imagery provided in the geographic information system. Multi-band blending is a known technique for reducing color seams in mosaic images composited from a collection of source images that contain exposure or illumination differences. Applying a multi-band blending technique, however, may smooth out desirable color discontinuities that are due to real scene differences. For example, a bright roof of a building may be adjacent to a deeply shadowed wall and ground. If these surfaces are textured from two different source images, blending would attempt to even out the difference, leading to a smudged appearance in the imagery. For instance, the roof would become darker and the wall would become lighter. In addition, because multi-band blending primarily affects low spatial frequencies, the contrast of high frequency details remain low in the brightened areas, resulting in a washed-out appearance.

SUMMARY

Aspects and advantages of the invention will be set forth in part in the following description, or may be obvious from the description, or may be learned through practice of the invention.

An exemplary aspect of the present disclosure is directed to a computer-implemented method of blending a plurality of source images. The method includes obtaining, with a computing device, a plurality of source images depicting a scene. Each of the plurality of source images includes a plurality of pixels. The method further includes accessing scene-dependent data associated with the plurality of source images and performing, with the computing device, a multi-band blending operation to generate a composite image from the plurality of source images. The multi-band blending operation implements a filtering operation based on the scene-dependent data to modify blending of adjacent pixels at a boundary between the plurality of source images.

Other exemplary implementations of the present disclosure are directed to systems, apparatus, non-transitory computer-readable media, and devices for blending a plurality of source images to generate a composite image.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
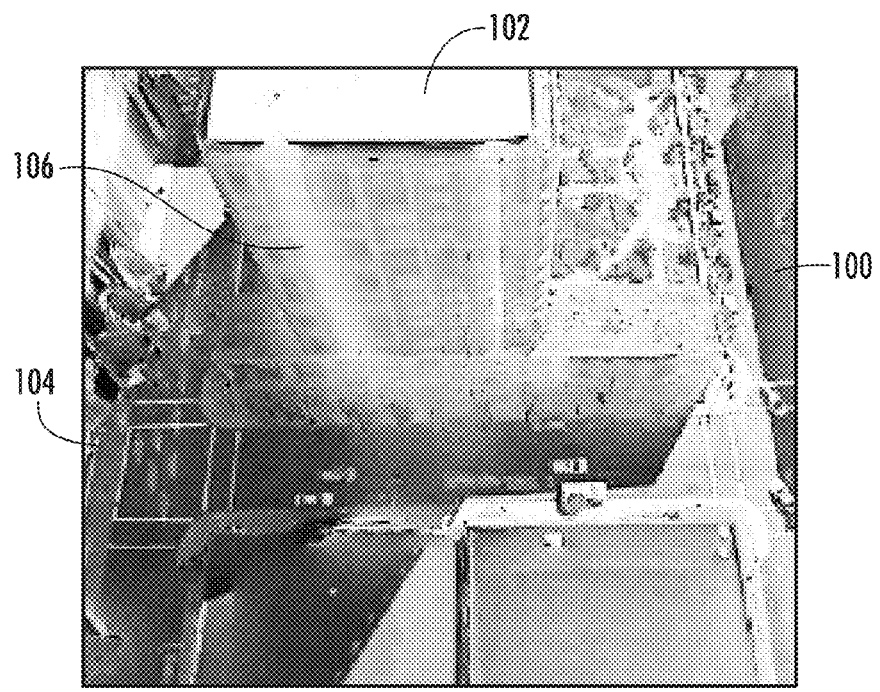
FIG. 1 depicts an exemplary composite image generated using a multi-band blending operation that does not implement a scene dependent filtering operation.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

OVERVIEW

Generally, the present disclosure is directed to systems and methods of generating a composite image from a plurality of source images using a multi-band blending operation that implements a scene dependent filtering operation. The multi-band blending operation can be used to smooth discontinuities between source images in the composite image. For instance, in the context of a geographic information system, textures applied to a three-dimensional model from a plurality of source images can be blended using a multi-band blending operation to provide a more realistic three-dimensional representation of a geographic area of interest. Blending the source images using a multi-band blending operation can smooth any unnatural color discontinuities in the composite image resulting from source images with illumination or exposure differences.

Blending between two different objects or surfaces in a scene that naturally have color and/or brightness differences can lead to visual artifacts in the composite image. For instance, as illustrated in FIG. 1, blending across a roof/ground boundary in textures associated with a geographic information system can result in smudging artifacts in the imagery. In particular, FIG. 1 depicts an exemplary composite image 102 that has been generated using a multi-band blending operation. As shown, the multi-band blending operation has combined pixel values associated with a bright roof 102 and a darker shadowed ground 104. The result is an unnatural brightening of the wall 106 of the building depicted in the image, giving the wall 106 a smudged and washed out appearance. This visual artifact can diminish the realistic appearance of the representation of the geographic area provided by the geographic information system.

According to aspects of the present disclosure, the multi-band blending operation implements a filtering operation to reduce blending between objects or surfaces that have natural color and/or brightness differences. More particularly, the typical space invariant upsampling that occurs during multi-band blending can be replaced by a scene-dependent filtering operation during upsampling that omits or reduces contributions from pixels associated with different objects in a scene during the multi-band blending process.

Figure 2:
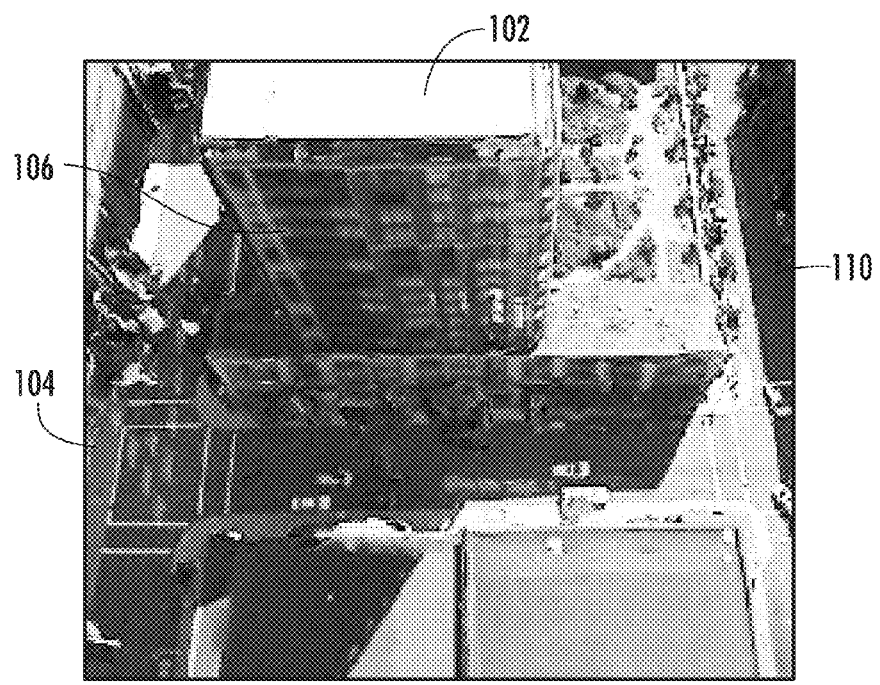
FIG. 2 depicts an exemplary composite image generated using a multi-band blending operation that does implement a scene dependent filtering operation according to an exemplary embodiment of the present disclosure.

An exemplary composite image 110 resulting from a scene dependent multiband blending process according to aspects of the present disclosure is depicted in FIG. 2. As shown, the scene dependent multi-band blending operation has not combined pixel values associated with the bright roof 102 and the darker shadowed ground 104 depicted in the composite image 110. As a result, the smudged and washed out appearance of the wall 106 has been reduced, enhancing the realistic appearance of the composite image 110.

The scene dependent filtering operation can be based on any suitable data that identifies two different objects in a scene that may naturally have color and/or brightness differences. For instance, in one aspect, the scene dependent filtering operation can be based on object identity data that identifies different objects depicted in the scene. For instance, a pixel can include data identifying that the pixel is associated with a particular object, such as a building or a street. The scene dependent filtering operation can reduce combining of pixel values from pixels associated with different objects during multi-band blending.

Alternatively, the scene dependent filtering operation can be based on height/slope data as a proxy for identifying different scene surfaces. In cases where the composite image includes textures applied to a three-dimensional model, the height (altitude) and/or slope of a particular pixel can be determined from the three-dimensional model. The filtering operation can avoid combining of pixel values associated with pixels of disparate height and/or slope during the multi-band blending operation to reduce blending of different objects, such as a building roof and ground objects. The use of height and/or slope data to implement the scene dependent filtering operation can be particularly useful in cases where semantic scene understanding is difficult to be automatically ascertained.

Exemplary Image Multi-Band Blending Technique

Figure 3:
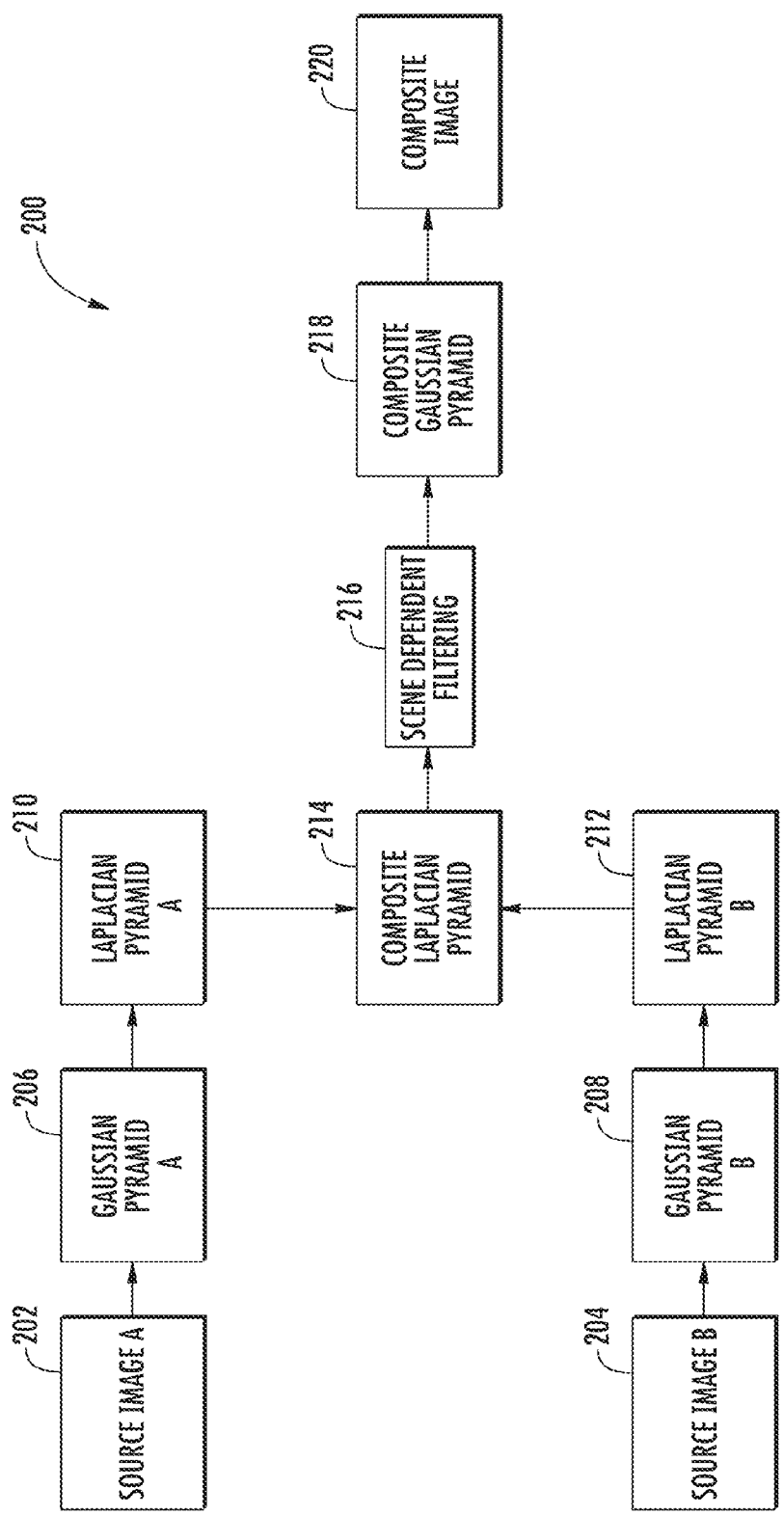
FIG. 3 depicts an overview of a multi-band blending operation implementing a scene dependent filtering operation according to an exemplary embodiment of the present disclosure.

FIG. 3 depicts an overview of an exemplary multi-band blending operation 200 according to an exemplary embodiment of the present disclosure. The multi-band blending operation 200 can be used to generate a composite image from a plurality of source images, such as source image A 202 and source image B 204. The multi-band blending operation 200 decomposes the source images into a set of band pass filtered images. The source images in each frequency band are then combined to form composite band pass images. The composite band pass images are then summed to form the composite image.

FIG. 3 illustrates the blending of two source images—source image A 202 and source image B 204—for purposes of illustration and discussion. Those of ordinary skill in the art, using the disclosures provided herein, should understand that the blending techniques according to aspects of the present disclosure are equally applicable to more than two source images. For instance, aspects of the present disclosure can be used to blend three or more source images.

Source image A 202 and source image B 204 can each include a plurality of pixels. Each pixel can include a color/grayscale value representative of the average light/color in an area depicted in the source image. Each pixel can also be tagged with an identifier (e.g. an ID number) corresponding to the original source image. The identifier of each pixel can be propagated through each stage in the multi-band blending operation 200.

The pixels can also include other information, such as scene dependent data. Similar to the identifier, the scene dependent data associated with each pixel can be propagated through each stage in the multi-band blending operation. The scene dependent data can include any data used to identify varying objects in a scene. For instance, the scene dependent data can include object identity data. The object identity data can identify a particular object, such as a building, street, monument, or other object, depicted in the pixel.

According to particular aspects of the present disclosure, the scene dependent data can include height and/or slope data. The height and/or slope data can be determined from a three-dimensional model on which the source images are texture mapped to provide a representation of a geographic area of interest. The height and/or slope data can be used to identify varying objects in a scene. For instance, pixels associated with widely disparate heights and slopes are likely associated with different objects in the scene. This height and slope data can be used to implement a filtering operation during multi-band blending to reduce blending between objects that can have natural color and brightness differences.

The first stage of the multi-band blending operation 200 includes generating a Gaussian pyramid for each of the source images 202 and 204. In particular, a Gaussian pyramid A 206 is generated for source image A 202. A Gaussian pyramid B 208 is generated for source image B 204. Generating a Gaussian pyramid for each source image decomposes each source image into a plurality of low pass filtered images.

The Gaussian pyramid for each source image can be generated by successively downsampling the source image into a plurality of images of successively lower resolution. Each Gaussian pyramid includes a plurality of levels, including a base level and a plurality of higher levels. Each of the higher levels is associated with the images of progressively lower resolution. The higher levels are obtained by using a weighting function to average pixel values for a set of pixels associated with a lower level in the Gaussian pyramid. Any suitable weighting function can be used without deviating from the scope of the present disclosure.

Figure 4:
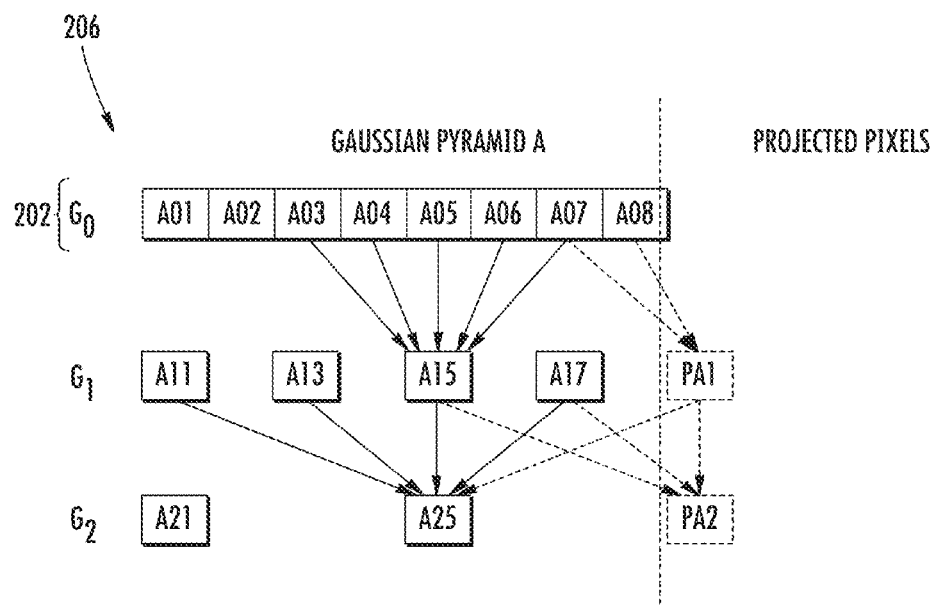
FIGS. 4 and 5 depict a representation of exemplary one-dimensional Gaussian pyramids generated from source images according to an exemplary embodiment of the present disclosure.

FIG. 4 depicts a representation of a one-dimensional Gaussian pyramid A 206 generated for source image A 202. As shown, the Gaussian pyramid A 206 includes a plurality of levels $G_0$, $G_1$, $G_2$ and so forth. Only three levels are illustrated in FIG. 4 for sake of clarity and illustration. The Gaussian pyramid A 206 can have more or fewer levels without deviating from the scope of the present disclosure. The level $G_0$ includes pixels associated with the source image A 202. To obtain the next higher level image of progressively lower resolution in the Gaussian pyramid 206, an array of pixels in the lower level are averaged to obtain a pixel value for a pixel in the next higher level. For instance, pixel values associated with pixels A03, A04, A05, A06, and A07 in level $G_0$ are averaged using a weighting function to obtain a pixel value for pixel A15 in level $G_1$. Pixel values for pixels A11, A13, A11 and PA1 in level $G_1$ can be obtained in a similar manner. Pixel values for pixels A11, A13, A15, A17, and PA1 of level $G_1$ are averaged to obtain a pixel value associated with A25 in level $G_2$. Pixel values for pixel A21 in level $G_2$ can be obtained in a similar manner. This process is iterated to obtained pixels for higher levels in the Gaussian pyramid. While FIG. 4 depicts the averaging of five pixels to obtain a pixel value for a pixel in a higher level of the Gaussian pyramid, those of ordinary skill in the art, using the disclosures provided herein, should understand that any number of pixels can be averaged without deviating from the scope of the present disclosure.

The process of generating Gaussian pyramid A 206 can also include generating projected pixel values for spatial regions located outside the original spatial extent of the source image A 202. For instance, a pixel value for projected pixel PA1 can be projected using the weighting function based on the pixel value associated with pixels A07 and A08. A pixel value for projected pixel PA2 can be projected using the weighting function based on the pixel values associated with pixels A15, A17, and PA1. The projected pixels can be used to implement the scene dependent filtering operation as will be discussed in more detail below.

Figure 5:
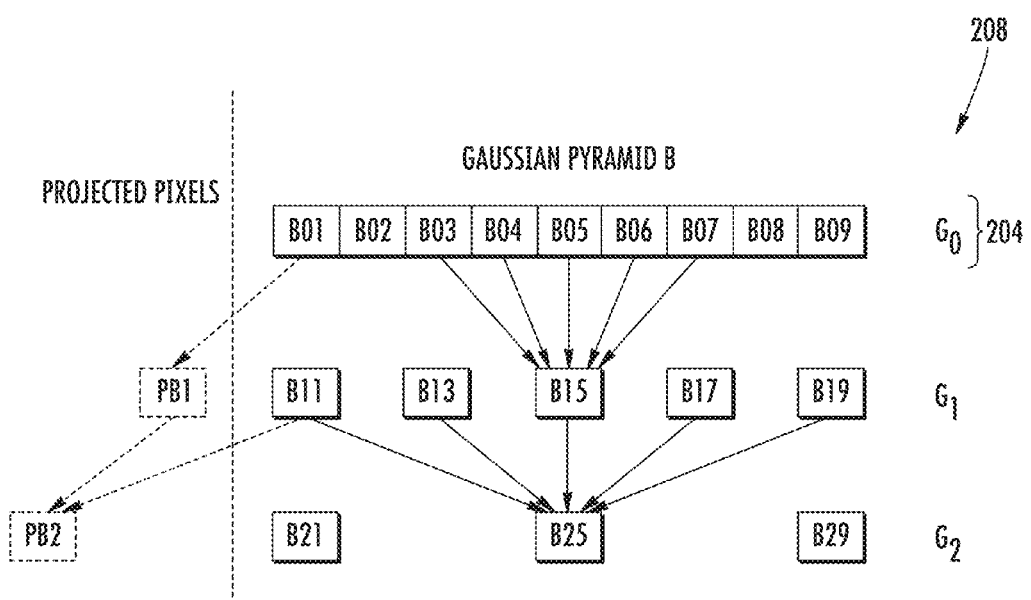

FIG. 5 depicts a representation of a one-dimensional Gaussian pyramid B 208 generated for source image B 204. Similar to Gaussian pyramid A 206 of FIG. 4, the Gaussian pyramid B 208 includes a plurality of levels $G_0$, $G_1$, $G_2$ and so forth. The level $G_0$ includes pixels associated with the source image B 204. To obtain the next higher level image of progressively lower resolution in the Gaussian pyramid B 208, an array of pixels in lower level are averaged to obtain a pixel value for a pixel in the next higher level. For instance, pixel values associated with pixels B03, B04, B05, B06, and B07 in level $G_0$ are averaged using a weighting function to obtain a pixel value for pixel B15 in level $G_1$. Pixel values for pixels B11, B13, B17 and B19 in level $G_1$ can be obtained in a similar manner. Pixel values for pixels B11, B13, B15, B17, and B19 of level $G_1$ are averaged to obtain a pixel value associated with B25 in level $G_2$. Pixel values for pixels B21 and B29 in level $G_2$ can be obtained in a similar manner. This process is iterated to obtained pixels with higher levels in the Gaussian pyramid. While FIG. 5 depicts the averaging of five pixels to obtain a pixel value for a pixel in a higher level of the Gaussian pyramid, those of ordinary skill in the art, using the disclosures provided herein, should understand that any number of pixels can be averaged without deviating from the scope of the present disclosure.

The process of generating Gaussian pyramid B 208 can also include generating projected pixel values for spatial regions located outside the original spatial extent of the source image B 204. For instance, a pixel value for projected pixel PB1 can be projected using the weighting function based on the pixel value associated with pixel B01. A pixel value for projected pixel PB2 can be projected using the weighting function based on the pixel value associated with pixel B11 and the pixel value associated with projected pixel PB1. The projected pixels can be used to implement the scene dependent filtering operation as will be discussed in more detail below.

Referring back to FIG. 3, once Gaussian pyramids for each source image have been obtained, each of the Gaussian pyramids is converted to a Laplacian pyramid. For instance, Gaussian pyramid A 206 is converted into Laplacian pyramid A 210. Similarly, Gaussian pyramid B 208 is converted into Laplacian pyramid B 212. To obtain the Laplacian pyramid for each Gaussian pyramid, each level of the Gaussian pyramid is subtracted from the next lowest level in the Gaussian pyramid. For example, a weighted sum of pixels of the next lower level (including projected pixels) is computed and subtracted from pixels of this level in the Gaussian pyramid.

For instance, a level $L_0$ in a Laplacian pyramid A 210 can be obtained by subtracting level $G_1$ from level $G_0$ in the Gaussian pyramid A 206. A level $L_1$ in Laplacian pyramid A 210 can be obtained by subtracting level $G_2$ from level $G_1$ in the Gaussian pyramid A 206. A level $L_2$ in Laplacian pyramid A 210 can be obtained by subtracting level $G_3$ (the next higher level relative to level $G_2$) from level $G_2$. The highest level in the Laplacian pyramid A 210 can be equal to the highest level in the Gaussian pyramid A 206.

Similar to Laplacian pyramid A 210, level $L_0$ in Laplacian pyramid B 212 can be obtained by subtracting level $G_1$ from level $G_0$ in the Gaussian pyramid B 208. Level $L_1$ in Laplacian pyramid B 212 can be obtained by subtracting level $G_2$ from level $G_1$ in the Gaussian pyramid B 208. Level $L_2$ in Laplacian pyramid B 212 can be obtained by subtracting level $G_3$ (the next higher level relative to $G_2$) from level $G_2$. The highest level in the Laplacian pyramid B 212 can be equal to the highest level in the Gaussian pyramid B 208.

After converting each Gaussian pyramid into a Laplacian pyramid, the Laplacian pyramids are combined to generate a composite Laplacian pyramid. For instance, Laplacian pyramid A 210 and Laplacian pyramid B 212 are combined to form the composite Laplacian pyramid 214. Any suitable technique can be used to generate the composite Laplacian pyramid. The composite Laplacian pyramid 214 can be generated by copying pixels associated with each Laplacian pyramid 210 and 212 into a corresponding location in the support region of composite Laplacian pyramid 214. Any pixels associated with an overlap or boundary region between source image A and source image B can include Laplacian pixel values that are an average or other combination of Laplacian pixel values associated with Laplacian pyramid A 210 and Laplacian pyramid B 212. Any suitable averaging function can be used to generate average pixel values for pixels in the overlap or boundary region of the composite Laplacian pyramid without deviating from the scope of the present disclosure.

An identifier can also be associated with each pixel in the composite Laplacian pyramid 214. For instance, a pixel copied into composite Laplacian pyramid 214 from Laplacian pyramid A 210 can have an identifier indicating the pixel originated from source image A 202. Similarly, a pixel copied into composite Laplacian pyramid 214 from Laplacian pyramid B 212 can have an identifier indicating the pixel originated from source image B 204.

The pixels in the composite Laplacian pyramid 214 can also have associated scene dependent data, such as object identity data or slope and/or height data. This scene dependent data can be used to implement a filtering operation 216 during reconstruction of a composite Gaussian pyramid 218 to reduce blending between objects with natural color and brightness differences according to exemplary aspects of the present disclosure.

Referring still to FIG. 3, the composite Laplacian pyramid 214 can be upsampled to reconstruct a composite Gaussian pyramid 218. The composite Gaussian pyramid 218 can include a plurality of levels including a base level and a plurality of higher levels of progressively lower resolution. Each level can have a plurality of Gaussian pixels having a reconstructed Gaussian pixel value. Reconstructed Gaussian pixel values for each Gaussian pixel can be computed by combining the Laplacian pixel value associated with the corresponding pixel in the composite Laplacian pyramid and combining pixel values for pixels in the next higher level in the composite Gaussian pyramid. The composite image 220 can be extracted from the composite Gaussian pyramid 218. For instance, the composite image 220 can be the base level of the reconstructed composite Gaussian pyramid 218.

Figure 6:
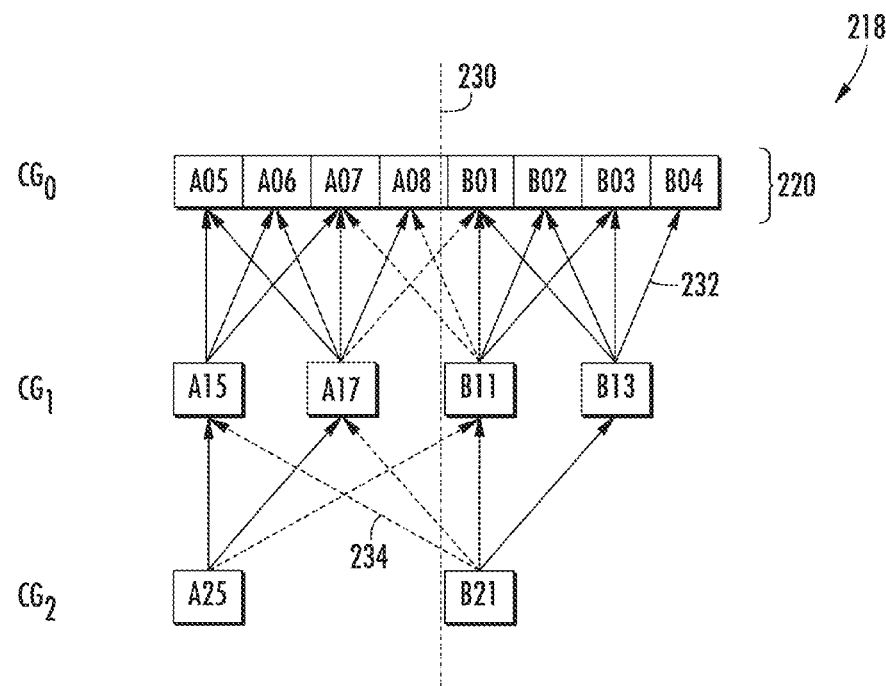
FIG. 6 depicts a composite Gaussian pyramid for a composite image generated from an exemplary multi-band blending process.

FIG. 6 depicts the reconstruction of a portion of a composite Gaussian pyramid 218 at the boundary between source image A and source image B according to a typical multi-band blending operation. In particular, FIG. 6 depicts the reconstruction of the composite Gaussian pyramid 218 at a boundary 230 between pixels A05, A06, A07, and A08 corresponding to a spatial location associated with source image A 202 and pixels B01, B02, B03, and B04 corresponding to a spatial location associated with source image B 204. As illustrated, the composite Gaussian pyramid 218 includes a plurality of levels including a base level $CG_0$ and a plurality of higher levels $CG_1$, $CG_2$, . . . . Three levels are illustrated in composite Gaussian pyramid 218 for example purposes. Those of ordinary skill in the art, using the disclosure provided herein, should understand that the composite Gaussian pyramid 218 can have any suitable number of levels.

The base level $CG_0$ of the composite Gaussian pyramid provides the composite image 220. The higher levels $CG_1$, $CG_2$ . . . , define levels of progressively lower resolution. The reconstructed Gaussian pixel values associated with the pixels in the base level $CG_0$ are determined by upsampling the higher levels in the composite Gaussian pyramid of progressively lower resolution. In particular, pixel values associated with higher levels in the composite Gaussian pyramid are combined to generate pixel values for the lower levels in the composite Gaussian pyramid.

In particular, as shown by the arrows 232 in FIG. 6, the reconstructed Gaussian pixel value associated with a Gaussian pixel can be computed by combining pixel values associated with Gaussian pixels in the next higher level of the composite Gaussian pyramid 218. As one example, the Gaussian pixel value associated with pixel A15 in level $CG_1$ of the composite Gaussian pyramid 218 can be computed by summing the Laplacian pixel value for the corresponding pixel A15 in the composite Laplacian pyramid 214 and the reconstructed Gaussian pixel values associated with pixels A25 and B21 in level $CG_2$ of the composite Gaussian pyramid 218. Similarly, the reconstructed Gaussian pixel value associated with pixel B01 in level $CG_0$ of the composite Gaussian pyramid 218 can be computed by summing the Laplacian pixel value for the corresponding pixel B01 in the composite Laplacian pyramid 214 and the reconstructed Gaussian pixel values associated with Gaussian pixels A17, B11, and B13 in the composite Gaussian pyramid 218.

As illustrated by the dashed arrows 234 in FIG. 6, pixels from different source images can contribute to the computation of cross-boundary Gaussian pixels in the composite Gaussian pyramid 218. For example, Gaussian pixel A25 contributes to the computation of the reconstructed Gaussian pixel value for Gaussian pixel B11. Gaussian pixel A17 contributes to the computation of the reconstructed Gaussian pixel value for Gaussian pixel B01. Similarly, Gaussian pixel B21 contributes to the computation of the reconstructed Gaussian pixel values for Gaussian pixels A15 and A17. Gaussian pixel B11 contributes to the computation of the reconstructed Gaussian pixel value for Gaussian pixels A07 and A08.

The reconstruction of the composite Gaussian pyramid as illustrated in FIG. 6 is suitable for blending source images depicting the same or similar objects at the boundary of the source images. The multi-band blending technique can smooth any discontinuities resulting from brightness and exposure differences in the source images. However, the cross-boundary contribution of Gaussian pixels associated with different objects having natural color and brightness differences can lead to visual artifacts in the composite image. For instance, if Gaussian pixel B11 is associated with a different object (e.g. the roof of a building) than an object associated with Gaussian pixels A07 and A08 (e.g. a shadowed ground), the computation of the Gaussian pixel values associated with A07 and A08 without scene dependent filtering can lead to visual artifacts, such as smudging, in the composite image 220.

According to aspects of the present disclosure, a scene dependent filtering operation 216 is implemented during reconstruction of the composite Gaussian pyramid 218 to reduce the combining of pixels values associated with different objects (e.g. objects of different elevation) during reconstruction of the composite Gaussian pyramid 218. In particular, scene dependent data associated with each pixel in the composite Laplacian pyramid 214 can be accessed. If the scene dependent data associated with the pixels indicates that the pixels are associated with the same object, the pixels can contribute to the combination of pixel values during reconstruction of the composite Gaussian pyramid 218 in accordance with typical multi-band blending techniques. If the scene dependent data indicates that the pixels are associated with different objects, the scene dependent filtering operation 216 can reduce or omit contribution of the pixels during reconstruction of the composite Gaussian pyramid 218. As one example, height and/or slope data associated with the pixels can be accessed. If the difference in height and/or slope of the pixels exceeds a threshold, the scene dependent filtering operation 216 can reduce contribution of the pixels during reconstruction of the composite Gaussian pyramid 218.

Figure 7:
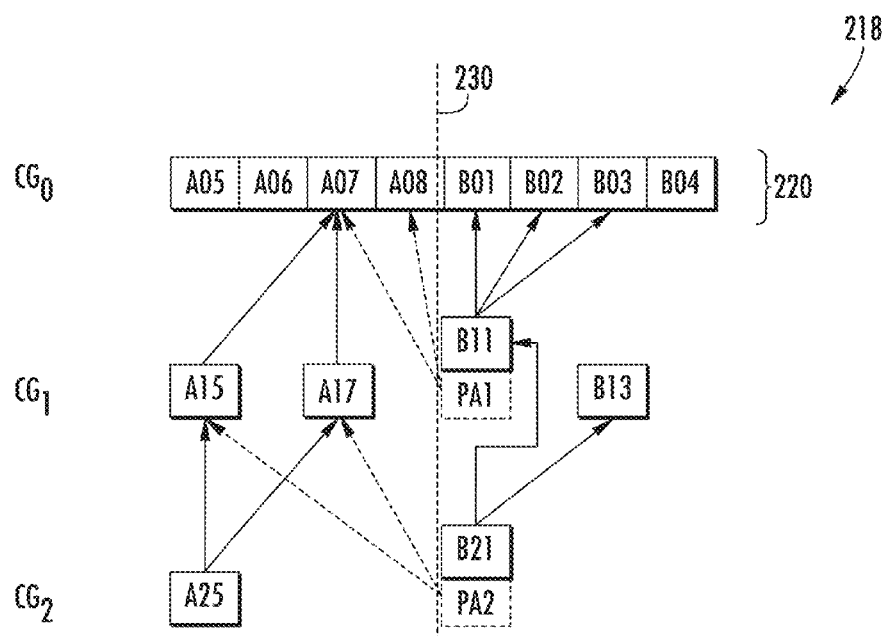
FIGS. 7 and 8 depict a composite Gaussian pyramid for a composite image generated from an exemplary multi-band blending processing implementing a scene dependent filtering operation according to an exemplary embodiment of the present disclosure.

FIG. 7 depicts the reconstruction of a composite Gaussian pyramid 218 implementing the scene dependent filtering operation 216 according to an exemplary aspect of the present disclosure. As shown in FIG. 6, the reconstructed Gaussian pixel value for Gaussian pixel A17 in level $CG_1$ of the composite Gaussian pyramid 218 is normally computed based at least in part by combining reconstructed Gaussian pixel values associated with Gaussian pixels A25 and B21 in level $CG_2$ of the composite Gaussian pyramid 218. However, if scene dependent data associated with Gaussian pixel B21 indicates that Gaussian pixel B21 is associated with a separate object than Gaussian pixel A11 (e.g. pixel B21 is associated with height data or slope data that differs from height data or slope data associated with pixel A17), the scene dependent filtering operation 216 will reduce the contribution of the Gaussian pixel B21 in the computation of the Gaussian pixel value for Gaussian pixel A17.

In particular, as shown in FIG. 7, the reconstructed Gaussian pixel value associated with Gaussian pixel B21 is replaced with a projected pixel value associated with a projected pixel PA2 during computation of the reconstructed Gaussian pixel value for the Gaussian pixel A17. The projected pixel value for projected pixel PA2 can be obtained during generation of Gaussian pyramid A 206 from source image A 202 as discussed above. Using the projected pixel value for projected pixel PA2 in the computation of the Gaussian pixel value for Gaussian pixel A11 reduces the generation of visual artifacts resulting from blending pixels associated with objects with natural color and brightness differences. A similar technique can be provided for computing the reconstructed Gaussian pixel value for Gaussian pixel A15.

The reconstructed Gaussian pixel value associated with Gaussian pixel B21 is still used in the computation of Gaussian pixel values for Gaussian pixels B11 and B13. More particularly, because pixels B11 and B13 are associated with the same source image as Gaussian pixel B21 (e.g. the pixels have the same identifier data); the pixel values are combined in accordance with normal multi-band blending techniques.

Moving to level $CG_0$ of the composite Gaussian pyramid 218, the reconstructed Gaussian pixel value associated with pixel A07 is normally computed using reconstructed Gaussian pixel values associated with Gaussian pixels A15, A11 and B11. However, if scene dependent data indicates that Gaussian pixel B11 is associated with a separate object depicted in the scene than Gaussian pixel A07, the scene dependent filtering operation 216 will reduce the contribution of the Gaussian pixel B11 in the computation of the Gaussian pixel value for Gaussian pixel A07.

In particular, the reconstructed Gaussian pixel value for Gaussian pixel value B11 is replaced with a projected pixel value associated with a projected pixel PA1 computed during the construction of the Gaussian pyramid A 206 for the source image A 202. Gaussian pixel B11 is still used in the computation of reconstructed Gaussian pixel values for Gaussian pixels B01, B02, and B03 because pixels B01, B02, and B03 are associated with the same source image (e.g. have the same identifier data) as the Gaussian pixel B11.

Figure 8:
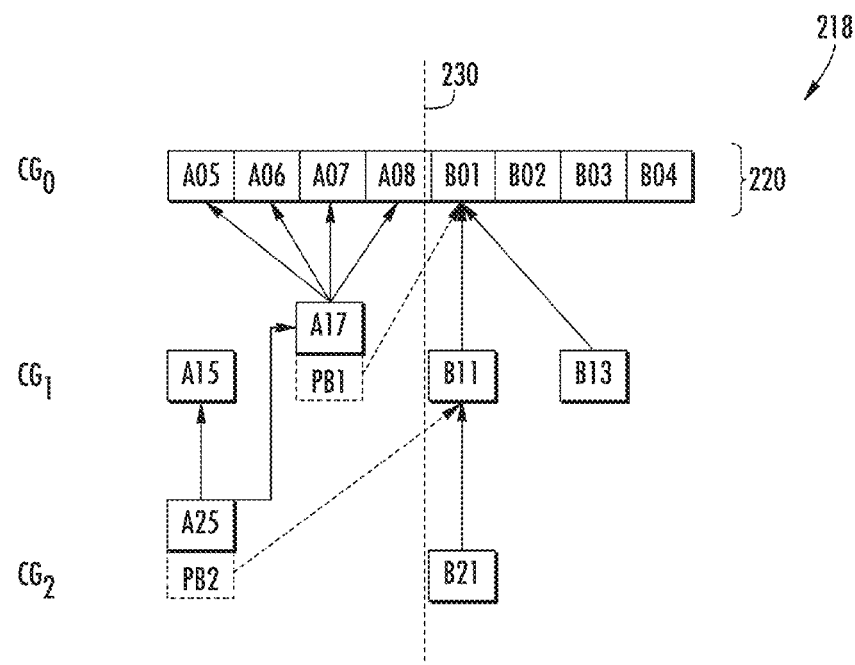

FIG. 8 further depicts the reconstruction of the composite Gaussian pyramid 218 implementing a scene dependent filtering operation 216 according to an exemplary aspect of the present disclosure. As shown in FIG. 6, the Gaussian pixel value associated with Gaussian pixel B 11 in level $CG_1$ is normally computed based at least in part on Gaussian pixel values associated with Gaussian pixels A25 and B21. However, if scene dependent data, such as elevation and/or slope data, indicates that Gaussian pixel A25 is associated with a different object than Gaussian pixel B11, the scene dependent filtering operation 216 replaces the Gaussian pixel value associated with A25 with a projected Gaussian pixel value associated with projected pixel PB2 in the calculation of the reconstructed Gaussian pixel value for Gaussian pixel B11. The projected pixel PB2 can be determined during the generation of the Gaussian pyramid B 208 for source image B204. The reconstructed Gaussian pixel value associated with Gaussian pixel A25 is still used during the computation of reconstructed Gaussian pixel values for Gaussian pixels A15 and A11 because the pixels are associated with the same source image (e.g. the pixels have the same identifier data).

Moving to level $CG_0$, the reconstructed Gaussian pixel value associated with pixel B01 is normally computed based on reconstructed Gaussian pixel values associated with pixels A17, B11, and B13. However, if scene dependent data indicates that Gaussian pixel A11 is associated with a separate object depicted in the scene than Gaussian pixel B01, the scene dependent filtering operation 216 will reduce the contribution of the Gaussian pixel A11 in the computation of the reconstructed Gaussian pixel value for Gaussian pixel B01. In particular, the reconstructed Gaussian pixel value A11 is replaced with a projected pixel value associated with a projected pixel PB1 computed during the construction of the Gaussian pyramid B 208 for the source image B 204. Gaussian pixel A11 is still used in the computation of reconstructed Gaussian pixel values for Gaussian pixels A05, A06, A07, and A08 because the pixels are associated with the same source image (e.g. have the same identifier data) as the Gaussian pixel A17.

Pyramid Data Structure

As discussed above, the multi-band blending operation implementing a scene dependent filtering operation selects, based on scene dependent data, pixel values to be used in the computation of reconstructed Gaussian pixel values for Gaussian pixels in a composite Gaussian pyramid. The pixel values can be selected from reconstructed Gaussian pixels associated with higher levels in the composite Gaussian pyramid or from projected pixel values associated with projected pixels determined when generating a Gaussian pyramid for a source image.

To directly implement the above multi-band blending technique, N separate Gaussian pyramids for each source image can be generated. Each of the N separate Gaussian pyramids can be stored in a separate data structure having a plurality of nodes corresponding to each node in the composite Gaussian pyramid. The N separate Gaussian pyramids can be accessed during reconstruction of the composite Gaussian pyramid, for instance, to obtain projected Gaussian pixel values used during cross-boundary computation of reconstructed Gaussian pixel values for pixels associated with different objects (e.g. pixels associated with disparate heights and/or slopes).

Alternatively, according to a particular aspect of the present disclosure, a dual pyramid data structure can be used to compactly store the N separate Gaussian pyramids of the source images, including the projected pixels of the Gaussian pyramids. The dual pyramid data structure can store two Gaussian pixel values associated with the two most popular source images for a spatial site. The scene dependent filtering operation can select one of the two pixel values to use during reconstruction of the composite Gaussian pyramid. For instance, the scene dependent filtering operation can select between a reconstructed Gaussian pixel computed for a spatial site or a projected Gaussian pixel stored in the dual pyramid data structure. The projected Gaussian pixel can be generated from the same source image as the pixel being reconstructed during reconstruction of the Gaussian pyramid.

While the present example is discussed with reference to a dual pyramid data structure for purposes of illustration and discussion, those of ordinary skill in the art, using the disclosures provided herein, should understand that any suitable pyramid data structure can be used without deviating from the scope of the present disclosure, such as a triple or quadruple pyramid data structure.

Figure 9:
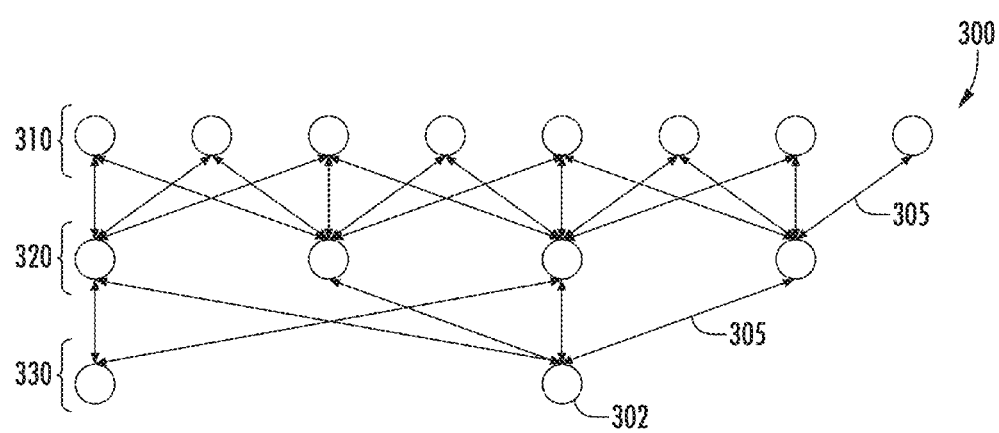
FIG. 9 depicts a graphical representation of an exemplary pyramid data structure according to an exemplary embodiment of the present disclosure.

FIG. 9 depicts an exemplary pyramid data structure 300 that can be used to directly implement the multi-band blending operation according to exemplary aspects of the present disclosure. The pyramid data structure 300 includes a plurality of nodes 302, one for each Gaussian pixel in a spatial site associated with the image. The plurality of nodes can be arranged in a plurality of levels, including a base level 310 and a plurality of higher levels 320, 330, . . . . The data structure can include links 305 between each node 302 and nodes in the next higher level of the pyramid data structure. While only three levels are depicted in FIG. 9, those of ordinary skill in the art, using the disclosures provided herein, should understand that any number of levels can be included in the pyramid data structure.

Each node 302 in the pyramid data structure can have a payload that includes identity data, scene dependent data, and/or pixel value data for the most popular source images at the node 302. For instance, in a dual pyramid data structure, each node stores identity data with the two most popular source images at the node 303. The popularity of a source image at a node can be determined based on the identity data associated with the nodes neighboring the node. For instance, the popularity of a source image at a node 302 can be based on how often identity data associated with the source image is stored in the nodes neighboring node 302.

Each node 302 in the data structure 300 also stores pixel values associated with the most popular source images at the node 302. In a dual pyramid data structure, each node 302 stores up to two pixel values associated with the two most popular source images at the node 302. For instance, each node can store a first Gaussian pixel value associated with a first source image and a second Gaussian pixel value associated with a second source image. The first Gaussian pixel value can be determined by generating a Gaussian pyramid from the first source image. The second Gaussian pixel value can be determined by generating a Gaussian pyramid from the second source image. At least one of the first Gaussian pixel value and the second Gaussian pixel value will be a projected Gaussian pixel value for the node 302.

The pixel values stored in each node can be accessed during the multiband blending operation. For instance, during reconstruction of the composite Gaussian pyramid, the scene dependent filtering operation can use the first Gaussian pixel value or the second Gaussian pixel value in computing a reconstructed Gaussian pixel value based on scene-dependent data associated with the source image.

Exemplary Computing System

Figure 10:
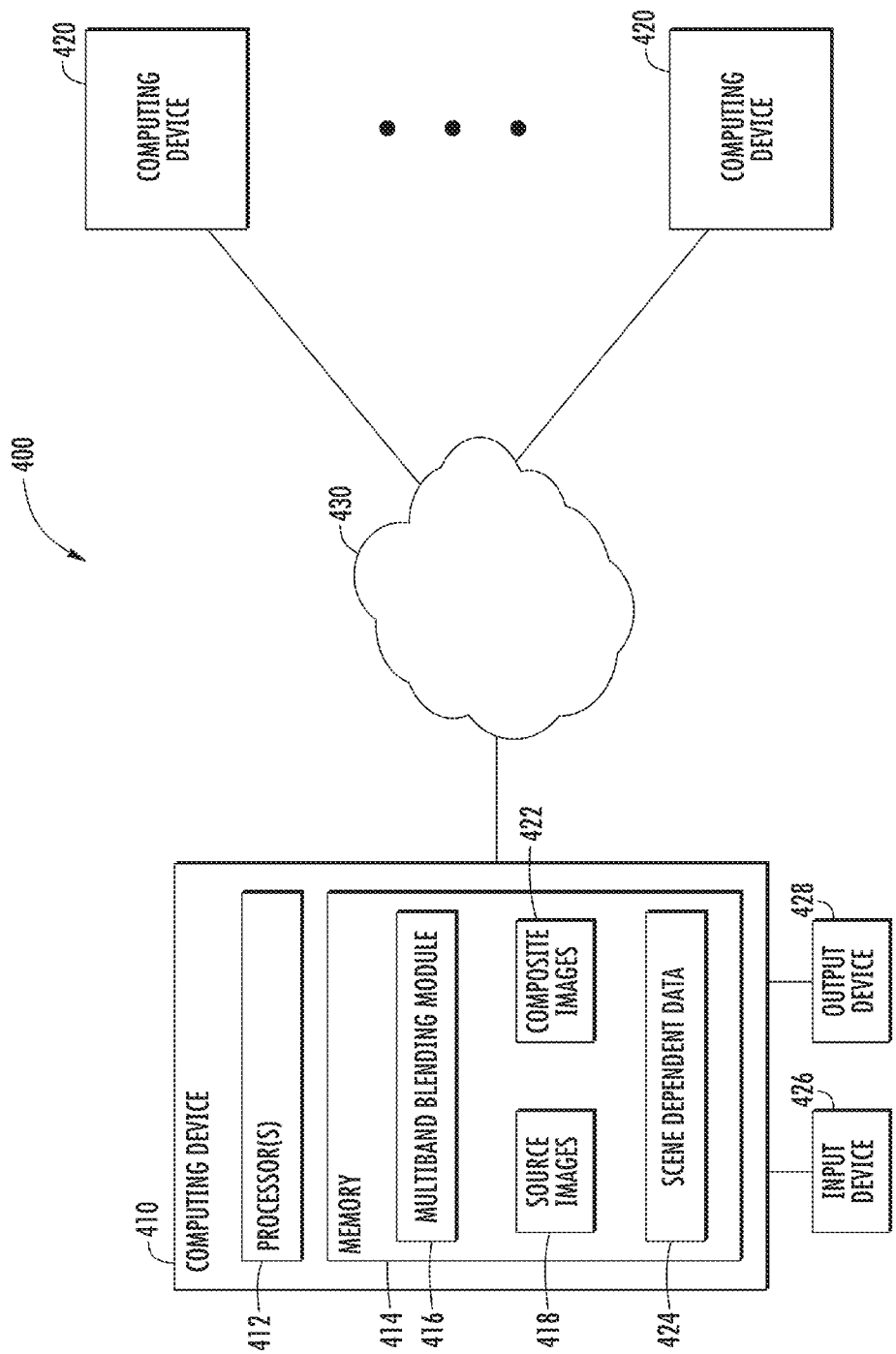
FIG. 10 depicts a system for generating a composite image from a plurality of source images according to an exemplary embodiment of the present disclosure.

FIG. 10 depicts an exemplary computing system 400 that can be used to implement the scene dependent multi-band blending operation according to exemplary aspects of the present disclosure. The system 400 includes a computing device 410. The computing device 410 can be any machine capable of performing calculations automatically. For instance, the computing device can include a general purpose computer, special purpose computer, laptop, desktop, integrated circuit, mobile device, smartphone, tablet, or other suitable computing device. The computing device 410 can have a processor(s) 412 and a memory 414. The computing device 410 can also include a network interface used to communicate with one or more remote computing devices 420 over a network 430. In one exemplary implementation, the computing device 410 can be a server, such as a web server, used to host a geographic information system, such as the Google Maps™ and/or the Google Earth™ geographic information systems provided by Google Inc.

The processor(s) 412 can be any suitable processing device, such as a microprocessor. The memory 414 can include any suitable computer-readable medium or media, including, but not limited to, RAM, ROM, hard drives, flash drives, or other memory devices. The memory 414 can store information accessible by processor(s) 412, including instructions that can be executed by processor(s) 412. The instructions can be any set of instructions that when executed by the processor(s) 412, cause the processor(s) 412 to provide desired functionality. For instance, the instructions can be executed by the processor(s) 412 to implement a multi-band blending module 416. The multi-band blending module 416 can provide for the blending of a plurality of source images to generate a composite image using any of the scene dependent filtering techniques disclosed herein or equivalents thereof.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Memory 414 can also include data that can be retrieved, manipulated, created, or stored by processor(s) 412. For instance, memory 414 can store source images 418, composite images 422 generated from the source images 418 by the multi-band blending module 416, and scene dependent data 424 used to perform a filtering operation during multi-band blending of the source images 418. The scene dependent data can be any data that can distinguish between objects depicted in a scene, such as object identity data, height data, slope data and/or other suitable data.

Computing device 410 can include or be coupled to one or more input devices 426 and output devices 428. Input device 426 may correspond to one or more peripheral devices configured to allow a user to interact with the computing device 410. Exemplary input devices can include but are not limited to a keyboard, touchscreen, microphone, mouse, touchpad, and other suitable input devices. Output device 428 can correspond to a device used to provide information to a user, such as a display device or other suitable output device.

Due to the inherent flexibility of computer based systems, system 400 can take a variety of forms. For instance, in one embodiment, the computing device 410 can be part of a general purpose computer. Alternatively, the computing device 410 can be a stand-alone special purpose computing device dedicated to perform the functionality discussed herein. Processes discussed herein can be implemented using a single computing device or multiple computing devices working in combination. Databases, applications, and modules can be implemented on a single system or distributed across multiple systems. Distributed components can operate sequentially or in parallel.

Exemplary Flow Diagram

Figure 11:
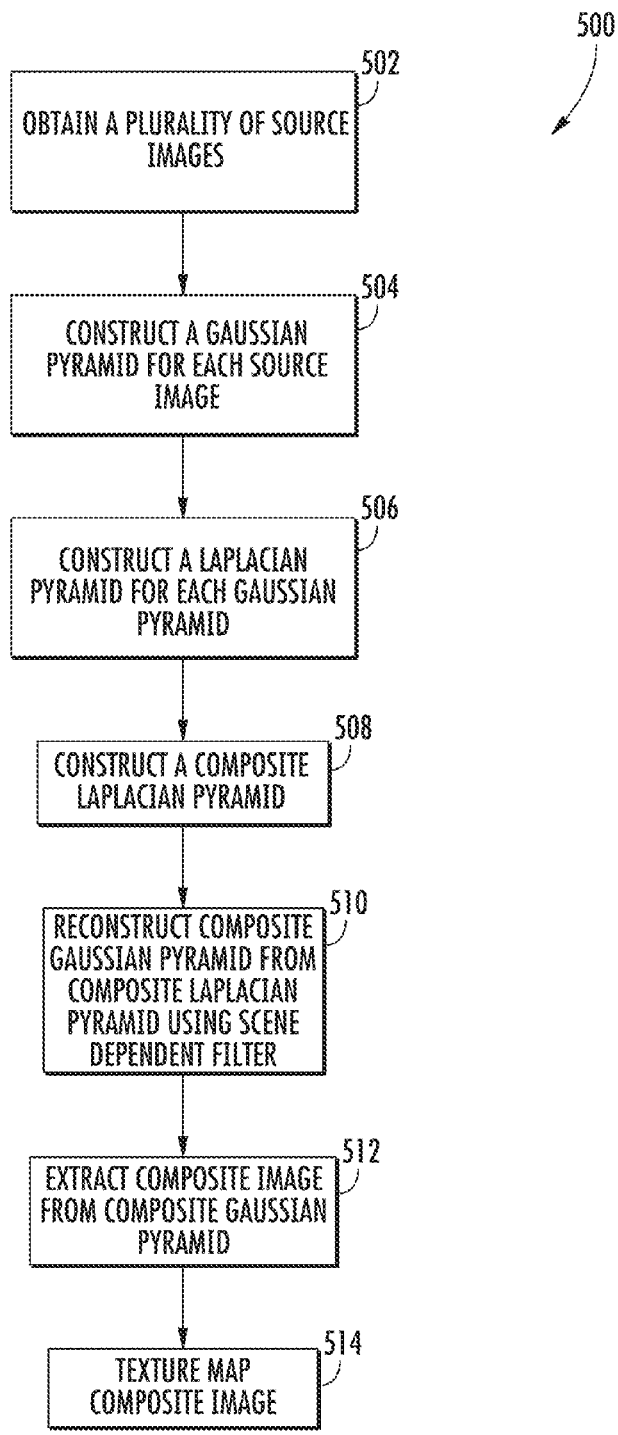
FIG. 11 depicts a flow diagram of an exemplary method for generating a composite image from a plurality of source images according to an exemplary embodiment of the present disclosure.

FIG. 11 depicts a flow diagram of an exemplary computer-implemented method 500 for generating a composite image from a plurality of source images according to an exemplary embodiment of the present disclosure. The method 500 can be implemented using one or more computing devices, such as the computing device 410 of FIG. 10. In addition, although FIG. 11 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

At (502), the method includes obtaining a plurality of source images. For instance, the multi-band blending module 416 implemented by computing device 410 can access a plurality of source images 418 stored in memory 414. The plurality of source images can include or be associated with scene dependent data, such as object identity data, height data, slope data, or other scene dependent data.

At (504), a Gaussian pyramid is constructed for each source image. For instance, the multi-band blending module 416 can generate a Gaussian pyramid for each source image. The Gaussian pyramid for each source image can be generated by downsampling the source image into a plurality of images of successively lower resolution. Each Gaussian pyramid includes a plurality of levels, including a base level and a plurality of higher levels. Each of the higher levels is associated with the images of progressively lower resolution. The higher levels are obtained by using a weighting function to average pixel values for a set of pixels associated with a lower level in the Gaussian pyramid. Generating a Gaussian pyramid for each source image can also include generating projected pixel values for projected pixels located outside the original spatial extent of the source image. The projected pixels can be used to implement the scene dependent filtering operation according to exemplary aspects of the present disclosure.

At (506), the method includes generating a Laplacian pyramid for each Gaussian pyramid. For instance, the multi-band blending module 416 implemented by computing device 410 can convert each Gaussian pyramid into a Laplacian pyramid. To obtain the Laplacian pyramid for each Gaussian pyramid, each level of the Gaussian pyramid is subtracted from the next lowest level in the Gaussian pyramid. For example, a weighted sum of pixels of the next lower level (including projected pixels) is computed and subtracted from pixels of this level in the Gaussian pyramid. The highest level in the Laplacian pyramid can be equal to the highest level in the Gaussian pyramid.

At (508), the method includes constructing a composite Laplacian pyramid from the plurality of Laplacian pyramids. For instance, the multi-band blending module 416 implemented by computing device 410 can combine the Laplacian pyramids into a composite Laplacian pyramid. The composite Laplacian pyramid can be generated by copying pixels associated with each Laplacian pyramid into a corresponding location in the support region of composite Laplacian pyramid. Any pixels associated with an overlap or boundary region between source images can include Laplacian pixel values that are an average or other combination of Laplacian pixel values. Any suitable averaging function can be used to generate average pixel values for pixels in the composite Laplacian pyramid without deviating from the scope of the present disclosure.

At (510), the method includes reconstructing a composite Gaussian pyramid from the composite Laplacian pyramid using a scene dependent filtering operation. For instance, the multi-band blending module 416 implemented by the computing device 410 reconstructs the composite Gaussian pyramid from the Laplacian pyramid. The composite Gaussian pyramid can be generated by upsampling the composite Laplacian pyramid to generate reconstructed Gaussian pixel values for Gaussian pixels in the composite Gaussian pyramid. The composite Gaussian pyramid can include a plurality of levels, including a base level and a plurality of higher levels of progressively lower resolution.

According to aspects of the present disclosure, the scene dependent filtering operations selects pixel values to use during computation of the reconstructed pixel values for the composite Gaussian pyramid during upsampling of the composite Laplacian pyramid. For instance, projected Gaussian pixel values associated with pixels in the next higher level of the composite Gaussian pyramid can be used in the computation of reconstructed Gaussian pixel values if scene dependent data indicates that the pixels are associated with disparate objects in the scene. Reconstructed Gaussian pixel values for pixels in the next higher level of the composite Gaussian pyramid can be used if scene dependent data indicates that the pixels are associated with the same or similar objects.

At (512), the method includes extracting the composite image from the composite Gaussian pyramid. For instance, the multi-band blending module 416 implemented by the computing device 410 can extract the composite image by extracting the base level of the composite Gaussian pyramid. The composite image can then be used in any suitable manner. For instance at (514), the composite image can be texture mapped to a three-dimensional model of a geographic area to provide a more realistic representation of a geographic area of interest in a geographic information system.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of blending a plurality of source images, comprising:
obtaining, by one or more computing devices, a plurality of source images depicting a scene, each of the plurality of source images comprising a plurality of pixels;
accessing, by the one or more computing devices, scene-dependent data associated with the plurality of source images, the scene dependent data indicative of different objects in the scene; and
performing, by the one or more computing devices, a multi-band blending operation to generate a composite image from the plurality of source images, the multi-band blending operation comprising a filtering operation based on the scene dependent data to modify blending of pixels located at a boundary between the plurality of source images.

2. The computer-implemented method of claim 1, wherein the scene dependent data comprises elevation data, slope data, or object identity data.

3. The computer-implemented method of claim 1, wherein the filtering operation reduces multi-band blending between pixels associated with objects of different elevation located at the boundary between the plurality of source images.

4. The computer-implemented method of claim 1, wherein the filtering operation reduces multi-band blending between one or more pixels associated with a first object depicted in a first source image and one or more pixels associated with a second object depicted in a second source image.

5. The computer-implemented method of claim 1, wherein the source images are geographic images depicting a geographic area.

6. The computer-implemented method of claim 5, wherein the composite image is texture mapped to a three-dimensional surface to provide a three-dimensional representation of the geographic area.

7. The computer-implemented method of claim 1, wherein performing, by the one or more computing devices, the multi-band blending operation to generate the composite image comprises:
constructing, by the one or more computing devices, a first Gaussian pyramid for a first source image and a second Gaussian pyramid for at least one second source image;
converting, by the one or more computing devices, the first and second Gaussian pyramids into first and second Laplacian pyramids;
generating, by the one or more computing devices, a composite Laplacian pyramid from the first and second Laplacian pyramids;
reconstructing, by the one or more computing devices, a composite Gaussian pyramid from the composite Laplacian pyramid, the composite Gaussian pyramid having a plurality of levels including a base level and a plurality of higher levels associated with progressively lower levels of resolution, each level having one or more Gaussian pixels having a reconstructed Gaussian pixel value; and
extracting, by the one or more computing devices, the composite image from the base level of the composite Gaussian pyramid.

8. The computer-implemented method of claim 7, wherein the filtering operation is performed during reconstruction of the composite Gaussian pyramid.

9. The computer-implemented method of claim 8, wherein the filtering operation reduces the combining of pixel values associated with objects of different elevation during calculation of reconstructed Gaussian pixel values for Gaussian pixels in the composite Gaussian pyramid.

10. The computer-implemented method of claim 8, wherein the filtering operation reduces the combining of pixel values associated with different objects depicted in the scene during calculation of reconstructed Gaussian pixel values for Gaussian pixels in the composite Gaussian pyramid.

11. The computer-implemented method of claim 7, wherein the multi-band blending operation is implemented using a dual pyramid data structure, the dual pyramid data structure having a plurality of nodes, one or more of the plurality of nodes having a payload providing a first Gaussian pixel value computed from the first source image and a second Gaussian pixel value computed from the second source image.

12. The computer-implemented method of claim 11, wherein the filtering operation uses, based on the scene dependent data, one of the first Gaussian pixel value or the second Gaussian pixel value in computing a reconstructed Gaussian pixel value for a Gaussian pixel in the composite Gaussian pyramid.

13. A computing system configured to generate a composite image from a plurality of source images, the computing device having one or more processors and one or more memory devices, the one or more memory devices storing non-transitory computer-readable instructions for execution by the one or more processors to cause the one or more processors to perform operations, the operations comprising:
obtaining a plurality of source images depicting a scene, each of the plurality of source images comprising a plurality of pixels;
accessing scene-dependent data associated with the plurality of source images, the scene dependent data indicative of different objects in the scene; and
performing a multi-band blending operation to generate a composite image from the plurality of source images, the multi-band blending operation comprising a filtering operation based on the scene dependent data to modify blending of pixels located at a boundary between the plurality of source images.

14. One or more tangible non-transitory computer-readable media storing computer readable instructions that when executed by one or more processors cause the one or more processors to perform operations, the operations comprising:
obtaining a plurality of source images depicting a scene, each of the plurality of source images comprising a plurality of pixels;
accessing scene-dependent data associated with the plurality of source images, the scene dependent data indicative of different objects in the scene; and
performing a multi-band blending operation to generate a composite image from the plurality of source images, the multi-band blending operation comprising a filtering operation based on the scene dependent data to modify blending of pixels located at a boundary between the plurality of source images.

* * * * *